UNITED STATES PATENT OFFICE.

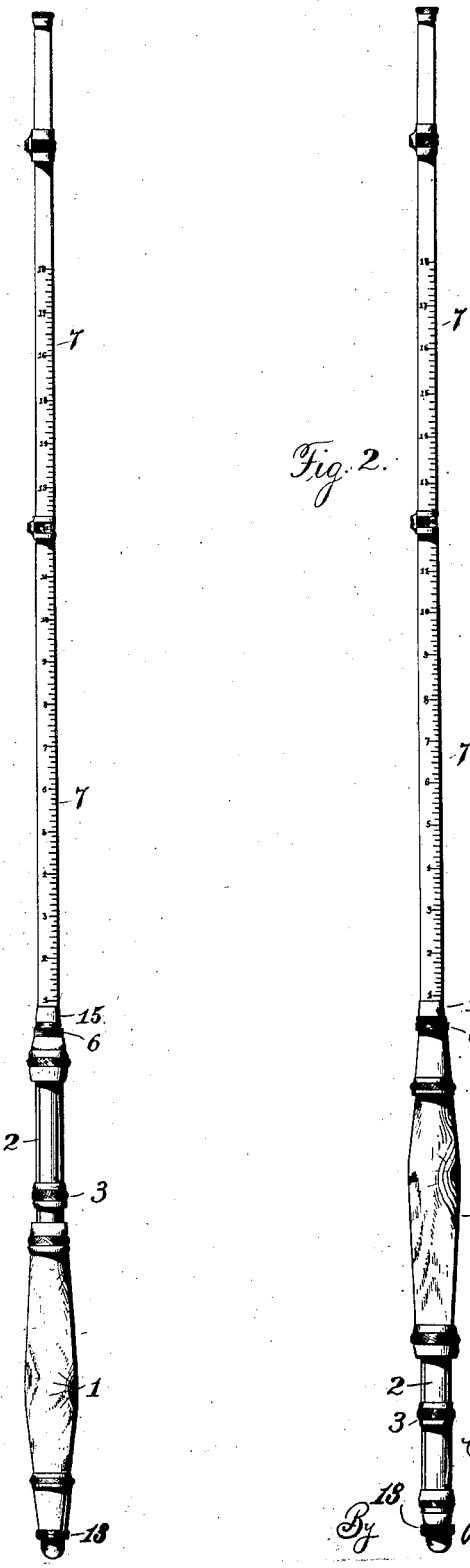

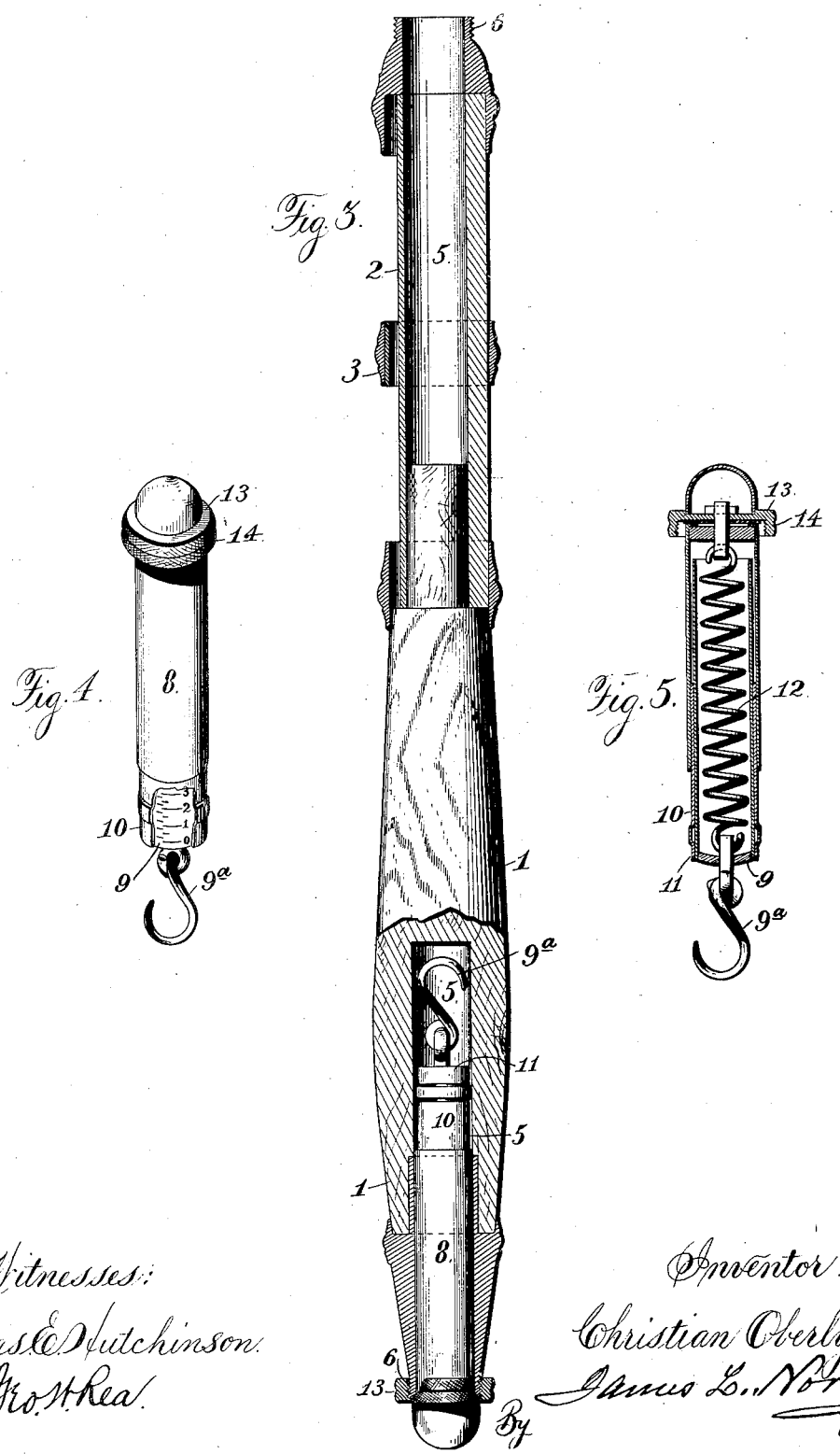

CHRISTIAN OBERLY, OF CARTHAGE, NEW YORK, ASSIGNOR OF ONE-HALF TO EPHRAIM H. MYERS, OF SAME PLACE.

FISHING-ROD.

SPECIFICATION forming part of Letters Patent No. 461,106, dated October 13, 1891.

Application filed July 21, 1890. Serial No. 359,431. (No model.)

*To all whom it may concern:*

Be it known that I, CHRISTIAN OBERLY, a citizen of the United States, residing at Carthage, in the county of Jefferson and State of New York, have invented new and useful Improvements in Fishing-Rods, of which the following is a specification.

This invention has for its object to provide a novel fishing-rod which is particularly designed for measuring and weighing the fish and is so constructed that the butt or handle portion contains a removable spring-balance and can be reversed to throw the reel-holder in front or rear of the grip.

The invention also has for its object to provide a novel grip portion for a fishing-rod, having a removable or replaceable weighing device of such construction that it can be stored in the hollow end of the grip portion, and carries an attached head which serves as a closing-stopper for such hollow end of the grip and as a handle for suspending the spring weighing device while weighing the fish.

To accomplish these objects my invention involves the features of construction, the combination or arrangement of parts, and the principles of operation hereinafter described and claimed, reference being made to the accompanying drawings, in which—

Figure 1 is a perspective view of sufficient of a fishing-rod to exhibit my invention, the butt or handle portion being shown in the position where the grip is in rear of the reel-holder. Fig. 2 is a similar view showing the handle portion reversed and the reel-holder in rear of the grip. Fig. 3 is a side elevation of the handle or grip portion, showing the end portions thereof in section to exhibit the internal construction and the arrangement of the spring weighing device; and Fig. 4 is a detail perspective view of the spring weighing device, which is adapted to be inserted into either end of the butt or handle portion. Fig. 5 is a longitudinal sectional view of the weighing device.

In order to enable those skilled in the art to make and use my invention, I will now describe the same in detail, referring to the drawings, wherein—

The numeral 1 indicates the grip of the butt or handle portion of a fishing-rod, 2 the reel-holder, and 3 the sliding reel-band by which the reel is clamped in the holder. The butt or handle portion of the fishing-rod is hollow at each end to provide internal chambers 5, and terminates in externally-screw-threaded end necks or collars 6. The first joint 7 of the fishing-rod is provided with graduations to constitute an exposed scale of eighteen inches, more or less, and the graduations are or may be such as to measure any part of the fraction of an inch. This scale is formed directly on the surface of the wood comprising the first joint and runs outwardly from a point in close proximity to the butt or handle portion of the fishing-rod. The object of this construction is to enable the sportsman to accurately measure the fish caught, and the relative arrangement of parts is such as to provide a very desirable rod.

The numeral 8 indicates a spring-balance which is of cylindrical form and is adapted to accurately fit into the chamber 5 at either end of the butt or handle portion of the rod. A graduated spring-barrel 9 slides in the external cylindrical casing and is provided with a hook $9^a$ for engaging with the fish to be weighed, and over the spring-barrel and sliding in the external cylindrical casing is arranged a sleeve 10, which is adapted to be adjusted longitudinally for the purpose of placing its edge 11 in proper coincidence with the graduations nearest the hook end of the spring-barrel. The purpose of this construction is that if the spring 12 of the weighing device becomes slightly distended the sleeve can be adjusted to the commencement of the graduations, and thus permit the weight of the fish to be conveniently read off from the graduations.

The end of the weighing device opposite the hook is provided with a swiveled head 13, which is preferably milled, as at 14, for the purpose of facilitating its rotation. The interior of this head is provided with a screw-thread adapted to engage either one of the screw-threaded necks or collars 6 in such manner that when the spring-balance is inserted into the chamber at either end of the butt or handle portion of the rod the screw-threaded rotary head can be screwed upon one of the collars or necks, and thereby retain the spring-balance in position. This construction provides a practically water-proof spring weighing device for fishing-rods and is a very useful and desirable feature.

The rotary head of the spring-balance serves as a closure for the end of the butt or handle portion when the weighing device is inserted thereinto, while if the weighing device be removed from the butt or handle portion the rotary head serves as a medium for suspending the spring-balance for weighing the fish. By this construction the rotary head not only serves as a closure for the end of the butt or handle portion, but also as a device for suspending the spring-balance when in use.

By providing a chamber at each end of the butt or handle portion of the rod and terminating each extremity of such handle portion in a screw-threaded neck or collar it will be obvious that the spring-balance can be inserted into either end of such handle portion and there secured by the rotary screw-threaded head, and, furthermore, it will be obvious that the tenon 17 on the end of the first joint of the rod can be inserted into either end of the butt or handle portion for the purpose of throwing the reel-holder in front or in rear of the grip, which is a feature that is very desirable in fishing-rods.

In practice I prefer to construct the grip portion of wood and the end portions of the butt or handle portion of metal, in order to provide for the proper construction of the screw-threaded necks or collars, and the spring-balance, with its rotary head, is also preferably composed of metal.

Having thus described my invention, what I claim is—

1. A fishing-rod comprising a hollow grip or handle portion, a removable and replaceable head closing the end of the hollow grip or handle portion, and a spring-balance rotatably attached to and removable and replaceable with said head, substantially as described.

2. A fishing-rod comprising a hollow grip or handle portion the end of which terminates in a screw-threaded neck or collar, a removable and replaceable screw-head closing the end of the hollow grip or handle portion, and a spring-balance swiveled to and removable and replaceable with said screw-head, substantially as described.

In testimony whereof I have affixed my signature in presence of two witnesses.

CHRISTIAN OBERLY.

Witnesses:
   E. G. SHORTT,
   A. A. COLLINS.